United States Patent [19]

Lin

[11] 4,321,172

[45] Mar. 23, 1982

[54] ORGANIC POLYMERS WITH ACYLUREA REPEATING UNITS HAVING TERTIARY AMINO GROUPS PENDANT THEREFROM AND CATHODIC ELECTROCOATING OF SAID POLYMERS

[75] Inventor: Shiow-Ching Lin, Arlington Heights, Ill.

[73] Assignee: DeSoto, Inc., Des Plaines, Ill.

[21] Appl. No.: 171,001

[22] Filed: Jul. 21, 1980

[51] Int. Cl.³ .................. C08L 79/08; C08L 75/02
[52] U.S. Cl. .................. 524/591; 204/181 C; 528/44; 528/59; 525/452; 525/454; 525/456; 524/901; 524/589
[58] Field of Search ............ 260/29.2 TN; 525/454, 525/452; 204/181 C; 528/59

[56] References Cited

U.S. PATENT DOCUMENTS

| | | | |
|---|---|---|---|
| 4,028,310 | 6/1977 | Schafer et al. | 528/67 |
| 4,195,147 | 3/1980 | Sekmakas et al. | 526/312 |
| 4,198,495 | 4/1980 | Sekmakas et al. | 525/328 |

*Primary Examiner*—Theodore E. Pertilla
*Attorney, Agent, or Firm*—Dressler, Goldsmith, Shore, Sutker & Milnamow, Ltd.

[57] ABSTRACT

Polymers with acylurea repeating units in their backbones and having tertiary amino groups pendant therefrom are disclosed, as are compositions useful for cathodic electrocoating and methods for electrocoating using these polymers.

20 Claims, No Drawings

ORGANIC POLYMERS WITH ACYLUREA REPEATING UNITS HAVING TERTIARY AMINO GROUPS PENDANT THEREFROM AND CATHODIC ELECTROCOATING OF SAID POLYMERS

DESCRIPTION

TECHNICAL FIELD

This invention relates to novel polymers containing acylurea repeating units having tertiary amino groups pendant therefrom, and particularly to cationic electrocoating from an aqueous bath containing same.

BACKGROUND ART

Polymers prepared from monoethylenically unsaturated monomers containing pendant tertiary amino groups are well-known, and have been rendered cationic and water dispersible by neutralization with a solubilizing acid to comprise a portion of an electrocoating bath. The dispersed polymer particles migrate to the cathode when a unidirectional electrical current is passed between the anode and cathode in the aqueous electrocoating bath, and deposit upon the cathode to form a coating thereon.

The co-assigned U.S. Pat. No. 4,198,495 and No. 4,195,147, both by K. Sekmakas and R. Shah, deal with some of the problems of amine-functional cathodic electrocoating compositions, especially from the standpoint of providing a stable aqueous dispersion at a pH value close to neutral.

The amine-functional copolymer systems of the prior art are inadequate because, during polymerization, the amine-functional monomers, which are commonly based on amine-functional derivatives of acrylic or methacrylic acids, tend to homopolymerize and thereby form locally high concentrations of amine-containing groups in portions of the copolymer molecule. These localized concentrations of amino groups tend to make neutralization with solubilizing acid less efficient, and this diminishes the dispersibility of the resultant copolymer in aqueous dispersions which leads to instability in the aqueous electrocoating bath. The method of U.S. Pat. No. 4,195,147 minimizes this inadequacy, but it does not eliminate it completely.

DISCLOSURE OF THE INVENTION

The present invention relates to organic polymers comprising substituted urea repeating units having pendant radicals bonded thereto through acyl groups, the radicals bearing at least one tertiary amino group. Uniform distribution of the substituted urea groups through the organic polymer is preferred because the substituent tertiary amino groups are thereby also uniformly distributed. This uniform distribution allows the tertiary amines to be more readily neutralized and dispersed in aqueous solutions, presumably because charge-charge interactions are minimized between the neutralized amino groups.

The polymers of this invention are preferably condensation polymers rather than addition polymers, such as acrylic copolymers. When used for electrocoating, at least a portion of the pendant tertiary amino groups are neutralized with a solubilizing acid to form salts and render the polymers cationic and dispersible with the aid of a water soluble organic solvent. The pH value of such a dispersion useful in electrocoating is about 1 to about 8, and preferably the pH value of the dispersion is in excess of about 5.

To electrocoat, an electrocoating bath is prepared comprising water having a polymer of this invention dispersed therein at a concentration of about 3 to about 20 percent by weight. A substrate to be coated is provided as the cathode of the electrocoating system along with an operably connected inert electrode as the anode. These electrodes are placed within the bath and a unidirectional electric current is applied between the anode and the cathode thereby coating the cathode with the organic polymer. The coated cathode is then washed and cured.

The polymers of this invention are preferably the polymeric product of (1) an organic polymer comprising repeating units containing a carbodiimide group reacted with (2) an organic compound containing a tertiary amino monocarboxylic acid. It is particularly preferred that substantially all of the carbodiimide groups are consumed in the reaction with the monocarboxylic acid, so the tertiary amino monocarboxylic acid is used in at least stoichiometric proportion based on the monocarboxylic acid functionality.

Organic polymers comprising repeating units containing a carbodiimide group are known in the art. In preferred practice herein, the repeating units comprising carbodiimide groups are uniformly distributed throughout the organic polymer so that the carbodiimide groups are themselves uniformly distributed throughout the organic polymer. Methods for the preparation of these preferred carbodiimide-containing polymers are also known in the art.

According to one synthetic method, an aliphatic or aromatic diisocyanate, such as iso-phorone diisocyanate or 2,4-toluene diisocyanate, is reacted with itself to prepare a polymer containing uniformly distributed carbodiimide groups. In a more preferred procedure, two moles of the diisocyanate are reacted with one mole of a dihydrogen atom source such as a dihydric alcohol, a di-secondary amine, or a secondary aminoalcohol, to prepare an oligomeric diisocyanate which is then reacted with itself to form the organic polymer comprising repeating units containing uniformly distributed carbodiimide groups. When uniformly distributed carbodiimide groups are not desired, the above dihydrogen atom sources may be mixed.

The carbodiimide-containing polymer is end capped with a monoisocyanate, as is known in the art. In preferred practice, the monoisocyanate is provided by the reaction of a monohydric alcohol, such as isopropanol, or a substituted phenol, such as 2,6-di-tert-butyl-p-cresol with the diisocyanate.

In most preferred practice, dihydric alcohols are reacted with the diisocyanate to first form oligomeric diisocyanates, which are then condensed to form carbodiimide-containing polymers. Preferably, the dihydric alcohol used has a molecular weight of about 60 to about 1500. Most preferably, the dihydric alcohol is a polyoxyethylene glycol or polyoxypropylene glycol having a molecular weight of about 200 to about 1,000.

As is also well-known in the art, phospholene oxide catalysts are useful in the preparation of organic polymers comprising repeating units containing a carbodiimide group. In most preferred practice, the catalyst selected is 1-phenyl-3-methyl phospholene-1-oxide.

Examining the organic polymers of this invention more closely, and particularly those which are more preferred herein, it can be seen that the polymers comprise repeating units of formula I:

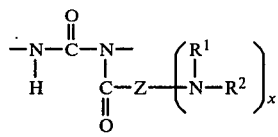

wherein Z is an organic radical;

$R^1$ and $R^2$ are the same or different, and are monovalent organic groups which together contain 2 to about 23 carbon atoms, or together form part of a cyclic structure containing a total of 2 to about 16 carbon atoms, or together with Z form a part of a cyclic structure containing a total of 2 to about 16 carbon atoms; and x is a number whose average value is at least 1.

The groups $R^1$ and $R^2$ of formula I may be the same or different monovalent organic groups which together contain 2 to about 23 carbon atoms, and preferably together contain 2 to about 8 carbon atoms. Thus, if both $R^1$ and $R^2$ are methyl, they would together contain two carbon atoms, and comprise an N,N-dimethylamino group. On the other hand, $R^1$ may be methyl while $R^2$ is tetradecyl, so that together the $R^1$ and $R^2$ groups contain 15 carbon atoms, and comprise an N-methyl-N-tetradecylamino group.

The $R^1$ and $R^2$ groups together may form part of a cyclic structure containing a total of 2 to about 23 carbon atoms. Examples of such cyclic structures, also containing the tertiary amino group, include N-aziridyl, N-morpholinyl, N-piperidyl, N-4-pipecolyl, and the like.

Considering formula I further, it is seen that the substituted urea group has a pendant radical, Z, bonded thereto through an acyl group, and each pendant radical, Z, bears at least one tertiary amino group, as previously described. The varied structures of the Z radical and the $R^1$ and $R^2$ groups is further discussed hereinafter.

In its simplest form, where x has an average value of one, the

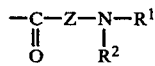

group may be formed by the reaction of a tertiary amino monocarboxylic acid, such as N,N-dimethyl glycine, N,N-diethyl-beta-alanine, or 4-(dimethylamino)benzoic acid with the carbodiimide-containing polymer.

In another embodiment of this invention, x has an average value of one and

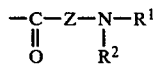

is a portion of a half-ester formed by the reaction N,N-dialkylalkanolaimine having a total of 4 to about 8 carbon atoms with a carboxylic acid anhydride having up to about 10 carbon atoms; the N,N-dialkyl groups being the previously described $R^1$ and $R^2$ groups. In this embodiment, the

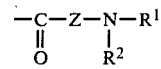

group may be further defined as a reaction product having the structure —V—Y, wherein the V group is prepared from the carboxylic acid anhydride having up to about 10 carbon atoms, and group Y is prepared from the N,N-dialkylalkanolamine having a total of 4 to about 8 carbon atoms.

Examples of N,N-dialkylalkanolamines suitable for preparing the Y group portion of the —V—Y group include N,N-dimethylethanolamine, N,N-diethylpropanolamine, N-ethyl-N-methyl-isopropanolamine, and the like. Suitable carboxylic anhydrides for preparing the V group portion of the —V—Y group include succinic anhydride, maleic anhydride, pyrotartaric anhydride, phthalic anhydride and the like. Succinic anhydride is particularly preferred, and maleic anhydride is preferred when it is desired to cross-link the polymers of this invention after their formation, as by addition polymerization or the like.

One particularly preferred —V—Y group prepared from the reaction of N,N-dimethylethanolamine and succinic anhydride has the structure of formula II shown below:

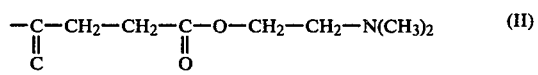

In other embodiments of this invention, the Z radical and tertiary amino group, together with $R^1$ and $R^2$, may form a portion of a substituted monocyclic or polycyclic ring system. Examples of cyclic organic compounds containing a tertiary amino monocarboxylic acid which are useful starting materials herein include 4-pyridinecarboxylic acid, 3-quinuclidinecarboxylic acid, 8-quinolinecarboxylic acid, and the like. The use of 3-quinuclidinecarboxylic acid as a starting material to prepare the polymers of this invention is particularly preferred and when so used, the portion of the repeating units of the polymer containing the group

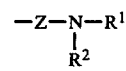

has the structure of formula III:

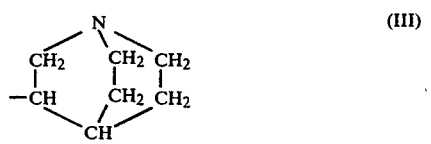

The Z radical bears at least one tertiary amino group, and when there is one tertiary amino group present per Z radical, the average value for x in Formula I is one. However, there may be a plurality of tertiary amino groups per Z radical, in which case the average value of x in Formula I would be greater than one. Examples of tertiary amino monocarboxylic acid-containing reactants which may be used to prepare the polymers of this invention wherein x is greater than one include N,N,N',N'-tetramethyl lysine, 3,5-(dimethylamino)benzoic acid, 2-pyrazinecarboxylic acid, and the like.

The tertiary amino carboxylic acid used to react with the carbodiimide-containing polymers is a monocarboxylic acid; i.e., it contains only one carboxylic acid group. The presence of but one carboxylic acid group helps assure that cross-linking of the polymer will not occur during synthesis.

In most coating uses, at least a portion of the pendant tertiary amino groups of the polymers of this invention are at least neutralized with a solubilizing acid to form salts and render the polymers cationic and dispersible in water with the aid of a water soluble organic solvent. While the tertiary amino groups may be neutralized prior to the formation of the polymers of this invention, in preferred practice, they are neutralized after the formation of these polymers.

Solubilizing acids are well known in the art and the preferred solubilizing acids for these tertiary amine polymers are organic acids, such as acetic acid, glycollic and most preferably, dimethylol propionic acid. However, inorganic acids which do not damage the deposited film, like phosphoric acid, are also useful. Acids which vaporize or decompose on heating are particularly contemplated since it is usually best not to have the solubilizing acid present in the final, cured coating. Formic acid and acetic acid will vaporize readily under the baking conditions generally utilized in the drying or curing of electrocoatings, and carbonic acid decomposes at those temperatures.

While all of the pendant amino groups may be neutralized, complete neutralization is not necessary. In preferred practice, at least about 25 percent of the tertiary amino groups are neutralized, and in more preferred practice about 60 to about 70 percent of these amino groups are neutralized. After neutralization, aqueous compositions containing the partially neutralized polymers of this invention have a pH of about 1 to about 8, and preferably in excess of a pH value of 5.

The water soluble organic solvents used to aid the aqueous dispersion of the neutralized polymers include water miscible solvents such as acetone, ethanol, isopropanol, and the like, as well as those organic solvents having a solubility of at least about 10 grams of organic solvent per hundred grams of water at ambient temperatures. These latter solvents include methyl ethyl ketone, methyl acetate and the like.

To use the polymers of this invention, one first prepares the organic polymers comprising repeating units containing a carbodiimide group. The carbodiimide-containing polymer is preferably prepared in the presence of the water soluble organic solvent, which solvent does not react with the carbodiimide groups. The tertiary amino monocarboxylic acid-containing compound is then added to the carbodiimide-containing polymer and water soluble organic solvent, and reacted therewith.

Thereafter, the resulting tertiary amino group-containing polymer may be neutralized to the desired extent and dispersed with sufficient water to form an electrocoating bath will contain about 3 to about 20 weight percent of the dispersed polymer, and will typically contain about 10 weight percent of the dispersed polymer. The substrate to be coated is made the cathode and an inert electrode is used as the anode; these electrodes being operably connected and placed within the formed electrocoating bath. Application of a unidirectional electric current between the electrodes results in the deposition and coating of the polymer of this invention on the cathodic substrate.

In addition to the amine functional polymers of this invention, other amine functional polymers or other materials may be incorporated into the electrocoating bath, for instance, to assist in the curing of the composition. Tertiary amino group-containing, hydroxy-functional polymers are frequently codeposited with other tertiary amino group-containing polymers, and are used in the art in conjunction with aminoplast resins such as melamine-formaldehyde condensates or benzoguanamine-formaldehyde condensates to assist in the curing of codeposited electrocoating. The use of codeposited aminoplast resin and tertiary amino group-containing, hydroxy-functional polymer is contemplated herein as one means for curing the electrocoated polymers of this invention.

The codeposited, coated substrate is washed, and then baked in an oven at a temperature of at least about 350° F. to cure the coating composition. As is known in the art, the cure reaction with aminoplast resins is both time and temperature dependent, and the use of higher baking temperatures such as about 400°–450° F. results in shorter cure times.

While electrocoating is one preferred use for the polymers of this invention, use of these polymers is not so limited. Thus, these polymers may be used in other aqueous coating applications, at higher concentrations, as in paints having a polymer solids content of more than 20 weight percent, up to about 60 weight percent. They may also be used neat, dissolved in an organic solvent at a solids content up to about 90 weight percent.

All proportions herein are by weight unless otherwise specified.

BEST MODES FOR CARRYING OUT THE INVENTION

Example 1: Preparation of a Poly(carbodiimide)

A mixture of iso-propyl alcohol (20 grams, 0.33 moles) and poly(propylene glycol) (563.53 grams, average molecular weight about 425 grams/mole; 1.33 moles) was added to 2,4-toluene diisocyanate (522 grams, 3 moles) dropwise over a period of four hours. The reaction temperature was maintained below 50° C. by the rate of addition. The mixture was agitated for two hours after the alcohol mixture addition was completed to ensure reaction of the hydroxy groups present. Methyl ethyl ketone (670 grams) and 1-phenyl-3-methyl phospholene-1-oxide (1.95 grams) were then added and the temperature raised to 80° C. to cause carbodiimide formation. Infrared spectrophometry was used to determine the end of the reaction by noting the absence of an isocyanate absorption, and the presence of a constant carbodiimide absorption; these observations occurring after 40 hours of reaction time.

Example 2: Preparation of Poly(acylurea) with Pendant Tertiary Amino Groups

Three moles each of succinic anhydride and dimethylethanolamine were reacted in acetone (500 milliliters) to form a tertiary amino monocarboxylic acid (the corresponding half-ester). The half-ester was isolated and found to have a melting point of 124°–126° C. A stoichiometric amount based upon the carboxyl group of the half-ester was added in several portions to the carbodiimide polymer solution of Example 1, the solution being at a temperature of 80° C. The reaction temperature was controlled between 70° C. and 90° C.

by the rate of half-ester addition. The reaction was continued for four hours after addition was complete, and yielded a final resin solution having a solids content of 66.3 weight percent.

Example 3: Electrocoating with Poly(acylurea) having Partially Neutralized Pendant Tertiary Amino Groups An aqueous acetic acid solution (1 percent by weight acetic acid) was added to the solution of Example 2 in an amount to neutralize 65 percent of the amino product groups, and the mixture was agitated vigorously until it became homogeneous. The aqueous dispersion so-provided had a pH value of about 5.2–5.4. This composition was then further diluted with deionized water until it contained 10 weight percent solids.

The 10 weight percent solids composition was used as an electrocoating bath with a steel panel serving as the cathode-substrate. After cationic electrodeposition using 75 volts from the thus prepared bath, the coated panel was baked at 150° C. for 30 minutes. A tough film of the polymer of this invention was coated on the steel panel after drying. This film was not resistant to methyl ethyl ketone and it had a pencil hardness of greater than HB. The film was very flexible and adhered strongly to the steel substrate.

What is claimed is:

1. A polymeric reaction product of
   (1) an essentially isocyanate-free organic polymer comprising repeating units containing a carbodiimide group,
      wherein said organic polymer comprising carbodiimide groups is the reaction product of (a) an aliphatic or aromatic diisocyanate and a monoisocyanate, said monoisocyanate end capping said polymer and
   (2) an organic compound containing a tertiary amino monocarboxylic acid.

2. The reaction product of claim 1 wherein said aliphatic or aromatic diisocyanate is an oligomeric disocyanate formed by reaction of said previously named diisocyanate with a dihydric alcohol.

3. The reaction product of claim 2 wherein the ratio of said first-named diisocyanate to said dihydric alcohol used to form said oligomeric diisocyanate is about two moles of diisocyanate to about one mole of dihydric alcohol.

4. A polymeric reaction product of
   (1) an essentially isocyanate-free organic polymer comprising repeating units containing a carbodiimide group,
      wherein said organic polymer comprising carbodiimide groups is the reaction product of (a) an aliphatic or aromatic diisocyanate, a dihydric alcohol and a monoisocyanate, said monoisocyanate endcapping said polymer,
   (2) an organic compound containing a tertiary amino monocarboxylic acid,
   said polymeric reaction product comprising repeating units of the formula:

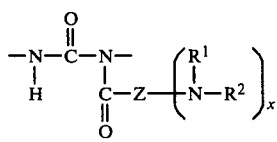

wherein Z is an organic radical;

$R^1$ and $R^2$ are the same or different, and are monovalent organic groups together containing 2 to about 23 carbon atoms, or together forming part of a cyclic structure containing a total of 2 to about 16 carbon atoms, or together with Z forming a part of a cyclic structure containing a total of 2 to about 16 carbon atoms; and x is a number whose average value is at least one.

5. The organic polymer of claim 1 wherein at least a portion of said tertiary amino group are neutralized with a solubilizing acid to form salts and render said polymer cationic and dispersible in water with the aid of a water soluble organic solvent.

6. The reaction product of claim 2 wherein said carbodiimide groups are uniformly distributed throughout said organic polymer.

7. The reaction product of claim 6 wherein substantially all of said carbodiimide groups are consumed by reaction with said tertiary amino monocarboxylic acid.

8. The reaction product of claim 2 wherein said dihydrogen atom source is a dihydric alcohol having a molecular weight of about 60 to about 1500.

9. The reaction product of claim 2 wherein at least a portion of said tertiary amino groups are neutralized with a solubilizing acid to form salts and render said polymer cationic and dispersible in water with the aid of a water soluble organic solvent.

10. The reaction product of claim 2 wherein said tertiary amino monocaboxylic acid is selected from the group consisting of 4-pyridinecarboxylic acid, 3-quinuclidinecarboxylic acid, 8-quinolinecarboxylic acid, N,N-dimethyl glycine, N,N-diethyl-beta-alanine, 4-(dimethylamino)benzoic acid, N,N,N,'N,'-tetramethyl lysine, 3,5-(dimethylamino)benzoic acid, 2-pyrazinecarboxylic acid and the half-ester reaction products of an N,N-dialkylalkanolamine having a total of 4 to about 8 carbon atoms with a carboxylic acid anhydride having up to about 10 carbon atoms.

11. The organic polymer of claim 4 wherein said repeating units are distributed uniformly.

12. The organic polymer of claim 4 wherein x has an average value of two.

13. The organic polymer of claim 12 wherein both $R^1$ and $R^2$ are methyl.

14. The organic polymer of claim 4 wherein x has an average value of about one.

15. The organic polymer of claim 14 wherein said

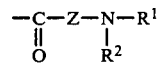

is a portion of a half-ester having the structure —V—Y and is the reaction product wherein
   V is prepared from a carboxylic acid anhydride having up to about 10 carbon atoms; and
   Y is prepared from an alkanolamine having a total of 4 to about 8 carbon atoms.

16. The organic polymer of claim 12 wherein said —V—Y group is prepared from succinic anhydride and N,N-dimethylethanolamine and has the formula:

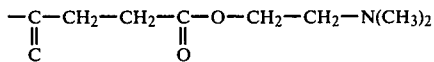

17. The organic polymer of claim 4 wherein has the formula:

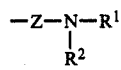

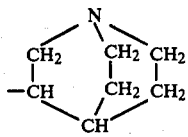

18. The organic polymer of claim 4 wherein at least a portion of said

groups are neutralized with a solubilizing acid to render said polymer cationic and dispersible with the aid of a water soluble organic solvent.

19. An aqueous composition having dispersed therein about 3 to about 20 weight percent of the organic polymer of claim 1 in which at least a portion of said amino groups are neutralized with a solubilizing acid to provide a pH value of said composition about 1 to about 8.

20. The aqueous composition of claim 19 wherein said composition has a pH value in excess of about 5.

* * * * *